UNITED STATES PATENT OFFICE.

THOMAS HENRY GRAY, OF BERMONDSEY, ASSIGNOR TO THOMAS BAKER RANDALL, OF THE COUNTY OF MIDDLESEX, ENGLAND.

PROCESS OF REFINING LINSEED-OIL.

SPECIFICATION forming part of Letters Patent No. 452,967, dated May 26, 1891.

Application filed November 4, 1890. Serial No. 370,311. (No specimens.)

*To all whom it may concern:*

Be it known that I, THOMAS HENRY GRAY, of 42 Fort Road, Bermondsey, in the county of Surrey, England, have invented a certain new and Improved Process for Refining Linseed-Oil, of which the following is a specification.

The object of this invention is to improve the siccative property of linseed-oil, and thereby to render it better for painting and varnish-making without impairing its light color, or, in other words, to obtain the equivalent of what is known as "boiled oil" with good color.

In describing the process I shall give certain proportions of the ingredients which I have found to produce the required results; but I wish it to be understood that these proportions are only relative to the quantity of oil treated, and also that I do not wish to confine myself to the exact proportions given.

In carrying out my invention—say for the treatment of one hundred and sixty gallons of crude linseed-oil—I place the oil in a suitable vessel or tank supplied with convenient means for agitating the contents of the tank. In a separate vessel a solution of caustic alkali is prepared. The solution is formed of two and one-half pounds of caustic potash or soda and five pints of hot or cold water, which are well stirred together for a sufficient period of time. The mixture is then allowed to stand until it clears itself by precipitation from the impurities contained in the caustic alkali. This solution, which should be of a strength of about specific gravity 30° Twaddle, is poured in a cold state into the oil, and the whole is agitated for, say, one and one-half hours, the effect being to bring the fatty matters contained in the oil to a condition for their precipitation by a subsequent operation. In another vessel a saline solution is produced, consisting of chloride of sodium or common salt, twenty-four pounds, and water, twelve gallons. This solution is added to the oil and the mass is subjected to agitation for, say, two hours, after which it is allowed to stand for about three days. The action of the saline solution is to cause the fatty matters separated by the caustic solution to precipitate—an operation which in general will be effected in the three days before mentioned. After standing about twelve hours the surface of the oil may be slightly agitated to break up any floating particles of fatty matter, which will then sink down through the oil. If allowed to remain long enough—say for a week or ten days—the supernatant oil will clear itself, and may then be decanted from the impurities in condition for immediate use; but if it be desired to expedite the clearing it may be decanted after three days into a suitable vessel wherein it may be heated to a temperature of 600° Fahrenheit, which drives off all water contained in it. Then after cooling it is ready for use.

Having now particularly described and ascertained the nature of the said invention, I declare that what I claim is—

The process for refining linseed-oil in a cold state, consisting in first mixing with the said oil a solution of caustic alkali of a strength about 30° Twaddle to render the fatty matters therein capable of precipitation, next adding to and stirring with the mixture a solution of common salt, next allowing the whole to stand for the precipitation of the said matters and afterward decanting the supernatant oil, all as herein set forth.

THOMAS HENRY GRAY.

Witnesses:
H. K. WHITE,
A. W. SPACKMAN.